(12) United States Patent
Seth et al.

(10) Patent No.: US 12,271,356 B2
(45) Date of Patent: Apr. 8, 2025

(54) DISINTEGRATING AN ENTITY OF RECORDS INTO SMALLER ENTITIES

(71) Applicant: International Business Machines Corporation, Armonk, NY (US)

(72) Inventors: Abhishek Seth, Deoband (IN); Soma Shekar Naganna, Bangalore (IN); Mahendra Singh Kanyal, Banbasa (IN); Devbrat Sharma, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/222,779

(22) Filed: Jul. 17, 2023

(65) Prior Publication Data

US 2025/0028691 A1 Jan. 23, 2025

(51) Int. Cl.
*G06F 16/20* (2019.01)
*G06F 16/215* (2019.01)
*G06F 16/2458* (2019.01)
*G06F 16/28* (2019.01)

(52) U.S. Cl.
CPC ........ *G06F 16/215* (2019.01); *G06F 16/2458* (2019.01); *G06F 16/285* (2019.01)

(58) Field of Classification Search
None
See application file for complete search history.

(56) References Cited

U.S. PATENT DOCUMENTS

| | | | | |
|---|---|---|---|---|
| 11,704,318 B1* | 7/2023 | Keivanloo | ............ | G06F 16/248 707/769 |
| 2007/0220037 A1* | 9/2007 | Srivastava | ............ | G06F 16/951 707/999.102 |
| 2008/0288482 A1* | 11/2008 | Chaudhuri | ........ | G06F 16/24556 707/999.005 |
| 2016/0012149 A1 | 1/2016 | Muchinsky et al. | | |
| 2018/0321869 A1* | 11/2018 | Gupta | .................... | G06F 3/0689 |
| 2022/0012219 A1 | 1/2022 | Pulipaty et al. | | |
| 2022/0138512 A1 | 5/2022 | Saillet et al. | | |
| 2023/0004977 A1 | 1/2023 | Cepek et al. | | |

FOREIGN PATENT DOCUMENTS

WO WO-2023165264 A1 * 9/2023

* cited by examiner

*Primary Examiner* — Jau Shya Meng
(74) *Attorney, Agent, or Firm* — Shackelford, McKinley & Norton, LLP; Robert A. Voigt, Jr.

(57) ABSTRACT

Described are techniques for disintegrating an entity into smaller entities. A graph ("first graph") for the entity of records to be disintegrated is constructed, where each vertex of the first graph represents a record in the entity of records to be disintegrated. The edges in the first graph connecting records in the entity of records represent matching links between the records, where each edge is associated with a weight corresponding to a similarity score. Furthermore, two or more additional graphs representing two or more sub-entities of the entity of records to be disintegrated are constructed. Such graphs are constructed based on selecting edges with a maximum weight out of the edges connected between each pair of records in the first graph or based on the number of connections each record has with other records in the first graph exceeding a threshold value.

20 Claims, 8 Drawing Sheets

DISINTEGRATING AN ENTITY OF RECORDS INTO SMALLER ENTITIES

TECHNICAL FIELD

The present disclosure relates generally to master data management, and more particularly to disintegrating an entity of records formed from a master data management system into smaller entities of records.

BACKGROUND

Master data management is a technology-enabled discipline in which business and information technology work together to ensure the uniformity, accuracy, stewardship, semantic consistency, and accountability of the enterprise's official shared master data assets.

Organizations, or groups of organizations, may establish the need for master data management when they hold more than one copy of data about a business entity. Holding more than one copy of this master data inherently means that there is an inefficiency in maintaining a "single version of the truth" across all copies. Unless people, processes, and technology are in place to ensure that the data values are kept aligned across all copies, it is almost inevitable that different versions of information about a business entity will be held. This causes inefficiencies in operational data use, and hinders the ability of organizations to report and analyze. At a basic level, master data management seeks to ensure that an organization does not use multiple (potentially inconsistent) versions of the same master data in different parts of its operations, which can occur in large organizations.

Master data management based solutions work with enterprise data (data that is shared by the users of an organization, generally across departments and/or geographic regions), perform indexing (organization of data according to a specific schema or plan) and link data from different sources, such as CRM®, Experian®, Salesforce®, web portal, etc. As a result, the master data management based system provides a single, trusted 360-degree view into customer, product, and location data across the enterprise.

In order to ensure the uniformity, accuracy, stewardship, semantic consistency, and accountability of the enterprise's official shared master data assets, master data management systems match record pair data by comparing different record attributes (e.g., name, address, date of birth) from each pair of records to determine if they match and should subsequently be linked based on a series of mathematically derived statistical probabilities and complex weight tables.

A "record," as used herein, includes information an organization needs to know about a particular person, location, product, supplier, business, or other entity. This record is referred to as the surviving record for an entity. A "record" may also be referred to as the master record or golden record. The goal of master data management is the definition of only one master record for each entity that is important to a business. An "entity," as used herein, refers to the core element that is used for business processes in master data management.

Across the enterprise, there may be many records that relate to a single entity. For example, there may be records for the same customer in purchasing, ordering, fulfillment, marketing, and analysis systems. Furthermore, there may be duplicate records for a customer within the same system. Master data management identifies the records that are related to a single entity and creates or persists an entity with the information available from all records based on composite rules available or selected in the system. All of the records that relate to an entity are referred to as contributors to that entity.

An entity may be defined by three things, namely, attributes, standardizations, and clustering criteria. Attributes are the data elements that are used by the entity. For example, a person entity might have first name, last name, address, city, state, postal code, phone number, and email address as its attributes.

In master data management systems, a master data management matching engine forms an entity of records based on "partial matching," where different record attributes (e.g., name, address) are compared from each pair of records, and if the similarity between such record attributes exceeds a threshold, then such records are deemed to match.

Upon identifying such matched pair of records, such records form part of the entity. Furthermore, the master data management matching engine matches records in the entity via transitive linking, where a match between records is made indirectly due to the behavior of other matches. For example, if record 1 matches to record 2 and record 2 matches to record 3 and record 3 matches to record 4, then based on transitive linking, master data management matching engine deems that record 4 matches record 1 even though there was no explicit rule that matched record 4 to record 1.

As a result of implementing partial matching along with transitive linking, the size of the entity may be quite large with two randomly picked records not matching. For instance, referring to the above example, even though the master data management matching engine determined that record 4 matches record 1, the similarity score corresponding to the degree of similarity between such a pair of records may be low, and hence, such a pair of records do not actually match each other.

Unfortunately, due to the size of such large entities, it is difficult to identify such unmatched pairs of records. Currently, there is not a means for improving the stability of the entity in terms of having the appropriately matched records in the entity.

SUMMARY

In one embodiment of the present disclosure, a computer-implemented method for disintegrating an entity of records into smaller entities comprises constructing a first graph comprising vertices, where each of the vertices represent a record in the entity of records, where edges in the first graph connecting records in the entity of records represent matching links between the records in the entity of records, and where a weight of each of the edges represents a score indicating a degree of similarity between a pair of records connected to each other via the edge. The method further comprises constructing two or more graphs representing two or more sub-entities of the entity of records based on selecting edges with a maximum weight out of edges connected between each pair of records in the first graph or based on a number of connections each record has with other records in the first graph exceeding a first threshold value.

Furthermore, in one embodiment of the present disclosure, the method additionally comprises obtaining data used for comparing each pair of records in the entity of records from a master data management system to determine if the pair of records match each other.

Additionally, in one embodiment of the present disclosure, the method further comprises generating the score for each pair of records in the entity of records indicating the degree of similarity between the pair of records using the obtained data. The method additionally comprises selecting those pairs of records whose score exceeds a second threshold value.

Furthermore, in one embodiment of the present disclosure, the entity of records comprises the selected pairs of records.

Additionally, in one embodiment of the present disclosure, the method further comprises selecting an edge out of one or more edges connected to a vertex for each vertex of the first graph with the maximum weight. The method additionally comprises removing edges in the first graph that were not selected. Furthermore, the method comprises constructing the two or more graphs comprising records connected to one or more other records using the selected edges while preserving matching links.

Furthermore, in one embodiment of the present disclosure, the method additionally comprises counting a number of connections each record has with other records in the first graph. The method further comprises selecting connections of those records with a number of connections that exceeds the first threshold value. Furthermore, the method comprises selecting a connection associated with the maximum weight out of two or more connections to those records whose number of connections did not exceed the first threshold value. Additionally, the method comprises constructing the two or more graphs comprising records connected to zero or more other records using the selected connections.

Additionally, in one embodiment of the present disclosure, the score indicating the degree of similarity between the pair of records connected to each other via the edge is generated based on vectorizing record attributes of the pair of records.

Other forms of the embodiments of the computer-implemented method described above are in a system and in a computer program product.

In this manner, more stable entities are provided by disintegrating a large entity of records formed from a master data management system that may include unmatched pairs of records into smaller entities of records with a greater stability (i.e., with a lower number of unmatched pairs of records).

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which.

DETAILED DESCRIPTION

Figure 1:
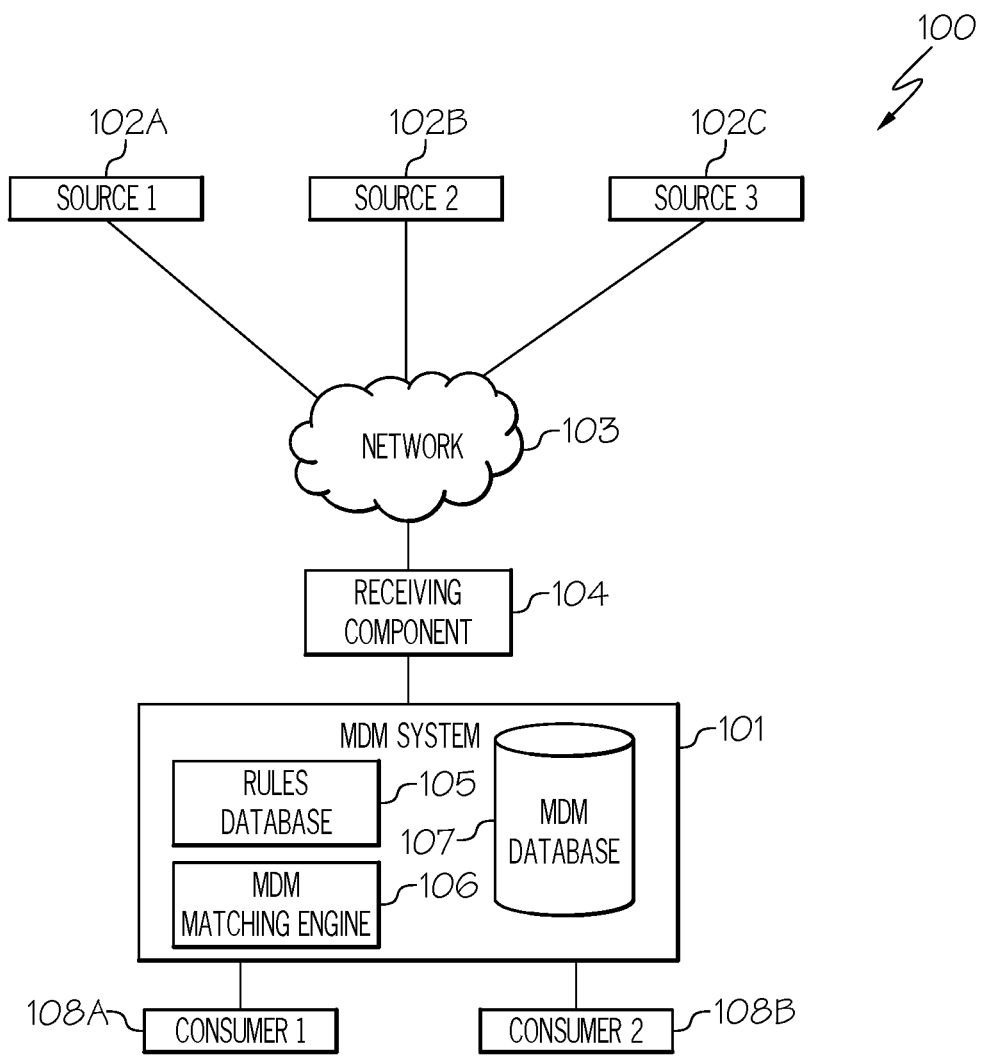
FIG. 1 illustrates an embodiment of the present disclosure of a communication system for practicing the principles of the present disclosure.

In one embodiment of the present disclosure, a computer-implemented method for disintegrating an entity of records into smaller entities comprises constructing a first graph comprising vertices, where each of the vertices represent a record in the entity of records, where edges in the first graph connecting records in the entity of records represent matching links between the records in the entity of records, and where a weight of each of the edges represents a score indicating a degree of similarity between a pair of records connected to each other via the edge. The method further comprises constructing two or more graphs representing two or more sub-entities of the entity of records based on selecting edges with a maximum weight out of edges connected between each pair of records in the first graph or based on a number of connections each record has with other records in the first graph exceeding a first threshold value.

In this manner, more stable entities are provided by disintegrating a large entity of records formed from a master data management system that may include unmatched pairs of records into smaller entities of records with a greater stability (i.e., with a lower number of unmatched pairs of records).

Furthermore, in one embodiment of the present disclosure, the method additionally comprises obtaining data used for comparing each pair of records in the entity of records from a master data management system to determine if the pair of records match each other.

In this manner, data that was used for comparing each pair of records in the entity of records to determine if the pair of records match each other is obtained and will be used to generate a score, such as a similarity score, for each pair of records in the entity of records.

Additionally, in one embodiment of the present disclosure, the method further comprises generating the score for each pair of records in the entity of records indicating the degree of similarity between the pair of records using the obtained data. The method additionally comprises selecting those pairs of records whose score exceeds a second threshold value.

In this manner, those pairs of records with a similarity score that exceeds a threshold value will be selected to form the entity of records to be disintegrated.

Furthermore, in one embodiment of the present disclosure, the entity of records comprises the selected pairs of records.

In this manner, the pairs of records with a similarity score that exceeds a threshold value forms the entity of records to be disintegrated.

Additionally, in one embodiment of the present disclosure, the method further comprises selecting an edge out of one or more edges connected to a vertex for each vertex of the first graph with the maximum weight. The method additionally comprises removing edges in the first graph that were not selected. Furthermore, the method comprises constructing the two or more graphs comprising records connected to one or more other records using the selected edges while preserving matching links.

In this manner, two or more graphs representing two or more sub-entities of the entity of records to be disintegrated is constructed based on selecting edges with a maximum weight out of the edges connected between each pair of records in the first graph.

Furthermore, in one embodiment of the present disclosure, the method additionally comprises counting a number of connections each record has with other records in the first graph. The method further comprises selecting connections of those records with a number of connections that exceeds the first threshold value. Furthermore, the method comprises selecting a connection associated with the maximum weight out of two or more connections to those records whose number of connections did not exceed the first threshold value. Additionally, the method comprises constructing the two or more graphs comprising records connected to zero or more other records using the selected connections.

In this manner, two or more graphs representing two or more sub-entities of the entity of records to be disintegrated is constructed based on the number of connections each record has with other records in the first graph.

Additionally, in one embodiment of the present disclosure, the score indicating the degree of similarity between the pair of records connected to each other via the edge is generated based on vectorizing record attributes of the pair of records.

In this manner, a score, such as the similarity score, indicating the degree of similarity between each pair of records connected to each other via an edge is generated.

Other forms of the embodiments of the computer-implemented method described above are in a system and in a computer program product.

As stated above, in master data management systems, a master data management matching engine forms an entity of records based on "partial matching," where different record attributes (e.g., name, address) are compared from each pair of records, and if the similarity between such record attributes exceeds a threshold, then such records are deemed to match.

Upon identifying such matched pair of records, such records form part of the entity. Furthermore, the master data management matching engine matches records in the entity via transitive linking, where a match between records is made indirectly due to the behavior of other matches. For example, if record 1 matches to record 2 and record 2 matches to record 3 and record 3 matches to record 4, then based on transitive linking, master data management matching engine deems that record 4 matches record 1 even though there was no explicit rule that matched record 4 to record 1.

As a result of implementing partial matching along with transitive linking, the size of the entity may be quite large with two randomly picked records not matching. For instance, referring to the above example, even though the master data management matching engine determined that record 4 matches record 1, the similarity score corresponding to the degree of similarity between such a pair of records may be low, and hence, such a pair of records do not actually match each other.

Unfortunately, due to the size of such large entities, it is difficult to identify such unmatched pairs of records. Currently, there is not a means for improving the stability of the entity in terms of having the appropriately matched records in the entity.

The embodiments of the present disclosure provide a means for providing more stable entities by disintegrating a large entity of records formed from a master data management system that may include unmatched pairs of records into smaller entities of records with a greater stability (i.e., with a lower number of unmatched pairs of records). In one embodiment, such smaller entities are formed based on constructing a graph ("first graph") of the entity of records to be disintegrated, where the vertices of the graph represent the records of the entity of records to be disintegrated and the edges (connections) in the graph connecting records in the entity of records represent the matching links between the records, where such matched links correspond to matched paired records that have a similarity score that exceeds a threshold value. Each edge may be associated with a weight representing the similarity score indicating a degree of similarity between the pair of records connected to each other via the edge. Graphs representing the sub-entities of the entity of records to be disintegrated may then be constructed based on selecting edges in the first graph with a maximum weight out of the edges connected between each pair of records in the first graph or based on selecting the connections for those records where the number of connections the record has with other records in the first graph exceeds a threshold value. Such selected edges or connections are then used to construct graphs of the sub-entities of the entity of records to be disintegrated containing records connected to one or more other records using the selected edges or the selected connections while preserving the matching links. A further discussion regarding these and other features is provided below.

In some embodiments of the present disclosure, the present disclosure comprises a computer-implemented method, system and computer program product for disintegrating an entity into smaller entities. In one embodiment of the present disclosure, a graph ("first graph") for the entity of records to be disintegrated is constructed, where each vertex of the first graph represents a record in the entity of records to be disintegrated. The edges in the first graph connecting records in the entity of records represent matching links between the records in the entity of records to be disintegrated. "Matching links," as used herein, refer to the edges that are used to connect records that are deemed to be matching, such as those pairs of records with a similarity score that exceeds a threshold value. In one embodiment, each edge is associated with a weight corresponding to such a similarity score. Furthermore, two or more additional graphs representing two or more sub-entities of the entity of records to be disintegrated are constructed, where the vertex of such graphs represents the records in the sub-entities of the entity of records to be disintegrated. In one embodiment, such graphs of the sub-entities of the entity of records to be disintegrated are constructed based on selecting edges with a maximum weight out of the edges connected between each pair of records in the first graph or based on the number of connections each record has with other records in the first graph exceeding a threshold value. A "connection," as used herein, refers to the edge that links or connects records together. In this manner, a large entity of records formed from a master data management system that may include unmatched pairs of records is disintegrated into smaller entities of records with a greater stability (i.e., with a lower number of unmatched pairs of records).

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Referring now to the Figures in detail, FIG. 1 illustrates an embodiment of the present disclosure of a communication system 100 for practicing the principles of the present disclosure. Communication system 100 includes a master data management (MDM) system 101. A person skilled in the art will understand that there can be a number of possible structures for organizing MDM system 101. For example, a database of master data may be maintained as a separate entity in MDM system 101. Alternatively, MDM system 101 may provide a view to a collection of source system databases, or the system may be a hybrid comprising some combination of the two. FIG. 1 will be described with reference to a system in which a separate database of master data is maintained by MDM system 101.

FIG. 1 further illustrates source systems 102A-102C (labeled as "Source 1," "Source 2," and "Source 3," respectively, in FIG. 1) connected to MDM system 101 via a network 103 and a receiving component 104. Source systems 102A-102C may collectively or individually be referred to as source systems 102 or source system 102, respectively.

A source system 102, as used herein, refers to a source (e.g., CRM®, Experian®, Salesforce®, web portal, etc.) of data (e.g., enterprise data). Such data among various source systems 102 are linked together by MDM system 101 in order to provide a single, trusted 360-degree view into customer, product, and location data across the enterprise.

In one embodiment, source systems 102 may represent different areas of an organization's functioning. For example, each of the source systems 102A-102C may be a sales system, a customer database system, and a payroll system. In one embodiment, source systems 102 continually generate new data. For example, source system 102A may be a sales system which generates data relating to a sale. In addition to data being handled within source system 102A, the data relating to the sale can be transmitted to receiving component 104 for subsequent operations performed by MDM system 101.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present disclosure.

In one embodiment, receiving component 104 receives data from each of the source systems 102, such as source systems 102A-102C, and performs an analysis to identify data which may be relevant to the organization's master data collection. For example, receiving component 104 may include an application program, a constituent component of a larger data processing system, or a component of MDM system 101. In one embodiment, receiving component 104 further processes the received data. For example, receiving component 104 may map the received data to a format compatible with the data format of MDM system 101. In this embodiment, receiving component 104 transmits processed data to MDM system 101.

In one embodiment, MDM system 101 includes a rules database 105 that includes a collection of policies and rules which have been determined to be appropriate for application to the organization's master data. Such policies and rules describe the types of data to be recorded as master data, the form of the data, and the actions to be performed upon the data. The policies and rules may be set (e.g., defined) based on a data governance strategy proposed by a data governance council of individuals who understand the organization's master data requirements.

In one embodiment, rules database 105 stores "composite rules" which provide the user the ability to specify various criteria (e.g., source priority, most frequent record at the entity level, most recent record to be available at the entity level) for determining a unified view of the relationships between entities.

In one embodiment, MDM system 101 also includes a MDM matching engine 106 configured to form an entity of records based on partial matching of records from source systems 102. "Partial matching," as used herein, refers to comparing different record attributes (e.g., name, address) from each pair of records from source systems 102, and if the similarity between such record attributes exceeds a threshold, then such records are deemed to match. In one embodiment, such compared record attributes are stored in a storage device of MDM system, such as MDM database 107 of MDM system 101. In one embodiment, the similarity between the paired records may be determined based on vectorizing the record attributes, such as via Word2vec. After being converted into real-valued vectors, a similarity measure, such as cosine similarity, may be used to determine the similarity between the two record attributes. Such a measure will result in a score (similarity score) between the values of 0 and 1 for vectors that have only positive values. Any negative scores can be made positive by taking its absolute value. If such a similarity score exceeds a threshold value, which may be user-designated, then such records are deemed to match.

Upon identifying such matched pair of records, MDM matching engine 106 selects such records to form part of the entity of records. Furthermore, in one embodiment, MDM matching engine 106 matches records in the entity via transitive linking, where a match between records is made indirectly due to the behavior of other matches. For example, if record 1 matches to record 2 and record 2 matches to record 3 and record 3 matches to record 4, then based on transitive linking, MDM matching engine 106 deems that record 4 matches record 1 even though there was no explicit rule that matched record 4 to record 1.

In one embodiment, such entities of records are stored in MDM database 107 of MDM system 101.

As discussed above, as a result of implementing partial matching along with transitive linking, the size of the entity may be quite large with two randomly picked records not matching. For instance, referring to the above example, even though master data management matching engine 106 determined that record 4 matches record 1, the similarity score corresponding to the degree of similarity between the paired records may be low, and hence, such paired records do not actually match each other.

Unfortunately, due to the size of such large entities, it is difficult to identify such unmatched pairs of records. Currently, there is not a means for improving the stability of the entity in terms of having the appropriately matched records in the entity.

In one embodiment, MDM system 101 is configured to provide more stable entities by disintegrating a large entity of records formed from master data management system 101 that may include unmatched pairs of records into smaller entities of records with a greater stability (i.e., with a lower number of unmatched pairs of records) as discussed below in connection with FIGS. 2, 3A-3B, 4A-4B and 5-8. A description of the software components of MDM system 101 used for disintegrating an entity of records into smaller entities of records with a greater stability is provided below in connection with FIG. 2. A description of the hardware configuration of MDM system 101 is provided further below in connection with FIG. 5.

System 100 further includes the master data consuming systems of an organization, such as consumers 108A-108B (identified as "Consumer 1," and "Consumer 2," respectively, in FIG. 1). Consumers 108A-108B may collectively or individually be referred to as consumers 108 or consumer 108, respectively. "Consumers" 108, as used herein, refer to the systems of the organization which require access to the data records of the organization's master data. It will be apparent that any number of consumers 108 may receive data from MDM database 107 of MDM system 101. It will be apparent also that each consumer 108 may include the same system as one of the source systems 102A-102C.

System 100 is not to be limited in scope to any one particular network architecture. System 100 may include any number of MDM systems 101, sources 102, networks 103, receiving components 104 and consumers 108. For example, system 100 may include a network, such as network 103, connecting MDM system 101 and consumers 108. In another example, system 100 may include a network, such as network 103, connecting MDM system 101 and receiving component 104.

A discussion regarding the software components used by MDM system 101 for disintegrating an entity of records into smaller entities of records with a greater stability is provided below in connection with FIG. 2.

Figure 2:
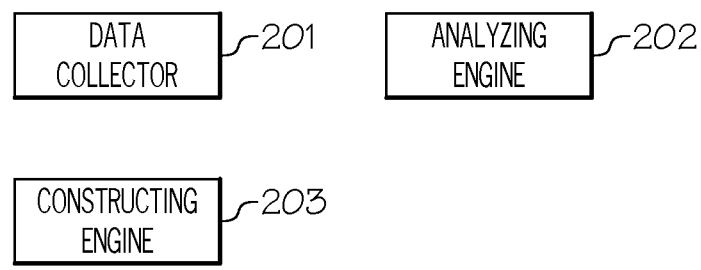
FIG. 2 is a diagram of the software components used by the master data management system to disintegrate an entity of records into smaller entities of records with a greater stability in accordance with an embodiment of the present disclosure.

FIG. 2 is a diagram of the software components used by MDM system 101 (FIG. 1) to disintegrate an entity of records into smaller entities of records with a greater stability in accordance with an embodiment of the present disclosure.

Referring to FIG. 2, in conjunction with FIG. 1, MDM system 101 includes a data collector 201 configured to obtain the data (e.g., record attributes, such as name, address, date of birth, etc.), referred to herein as the "pair comparison data," that was used by MDM matching engine 106 for comparing each pair of records from source systems 102 to determine if such a pair of records match each other. Such data pertains to those records that were found to be matched by MDM matching engine 106 that now form the entity of records to be disintegrated.

As discussed above, MDM matching engine 106 performs partial matching to determine if such a pair of records match each other. As discussed above, "partial matching," as used herein, refers to comparing different record attributes (e.g., name, address) from each pair of records from source systems 102, and if the similarity between such record attributes exceeds a threshold, then such records are deemed to match. In one embodiment, such compared record attributes are stored in fields of a database, such as MDM database 107. In one embodiment, data collector 201 obtains such data (compared record attributes) from MDM database 107 that was used for comparing each pair of records to determine if the pair of records match each other.

Furthermore, in one embodiment, MDM system 101 includes an analyzing engine 202 configured to generate a similarity score for each pair of records in the entity of records to be disintegrated using the obtained data (e.g., record attributes). In one embodiment, such a similarity score indicates a degree of similarity between the pair of records using the obtained data (e.g., record attributes). In one embodiment, analyzing engine 202 generates the similarity score based on vectorizing the record attributes, such as via Word2vec, Doc2Vec, GloVe, etc. After being converted into real-valued vectors, a similarity measure, such as cosine similarity or the Euclidean distance, may be used to determine the similarity between the two record attributes.

"Cosine similarity," as used herein, refers to a measure of similarity between two non-zero vectors defined in an inner product space. Cosine similarity is the cosine of the angle between the vectors. That is, it is the dot product of the vectors divided by the product of their lengths. If the measurement exceeds a threshold value, which may be user-designated, then analyzing engine 202 selects such a pair of records to be utilized for constructing a graph for the entity of records to be disintegrated as discussed below.

In one embodiment, the Euclidean distance is calculated as the square root of the sum of the squared differences between the two feature vectors. If the distance exceeds a threshold value, which may be user-designated, then analyzing engine 202 selects such a pair of records to be utilized for constructing a graph for the entity of records to be disintegrated as discussed below.

In one embodiment, the similarity measure is a score between the values of 0 and 1 for vectors that have only positive values. In one embodiment, any negative scores can be made positive by taking its absolute value.

Analyzing engine 202 utilizes various software tools for generating the similarity score, which can include, but are not limited to, TensorFlow®, MathWorks®, plus sklearn, Scikit-learn®, etc.

MDM system 101 further includes a constructing engine 203 configured to construct a graph ("first graph" represented herein as graph "G") for the entity of records to be disintegrated that includes the selected pairs of records (those selected by analyzing engine 202). In one embodiment, each vertex of the constructed graph represents one of such selected records and the edges (connections) between such records represents the matching links between such records. "Matching links," as used herein, refer to the edges that are used to connect records that are deemed to be matching, such as those pairs of records with a similarity score that exceeds the threshold value.

In one embodiment, each edge is associated with a weight corresponding to the similarity score obtained by analyzing engine 202. That is, each edge is associated with a weight indicating the degree of similarity between the pair of records connected to each other via the edge.

Constructing engine 203 is further configured to construct two or more additional graphs (represented herein as graphs "H") representing two or more sub-entities of the entity of records to be disintegrated, where the vertex of such graphs represents the records in the sub-entities of the entity of records to be disintegrated.

In one embodiment, constructing engine 203 is configured to populate the edges and records in such graphs of the sub-entities of the entity of records to be disintegrated based on selecting edges with a maximum weight out of the edges connected between each pair of records in the first graph (graph of the entity of records to be disintegrated) or based on the number of connections each record has with other records in the first graph exceeding a threshold value as discussed below. A "connection," as used herein, refers to the edge that links or connects records together.

In one embodiment, constructing engine 203 constructs the graphs of the sub-entities of the entity of records to be disintegrated based on selecting edges with a maximum weight out of the edges connected between each pair of records in the first graph (graph of the entity of records to be disintegrated) using the following algorithm (Algorithm 1):

Let V represents the set of vertices and $v_i$ represents the $i^{th}$ vertex in graph G respectively.
Let U represents the set of vertices and $u_i$ represents the $i^{th}$ vertex in graph H respectively.
For each $v_i \in V$:
  Suppose $e_{i,j}$ is the edge between vertex $v_i$ and $v_j$. Let $e_{i,max}$ be the set of edges connecting to $v_i$ and having maximum weight among all the edges connecting to $v_i$.
  For each $e_{i,k} \in e_{i,max}$:
    Add an edge between $u_i$ and $u_k$ in H with weight of edge $e_{i,k}$.

Figure 3B:
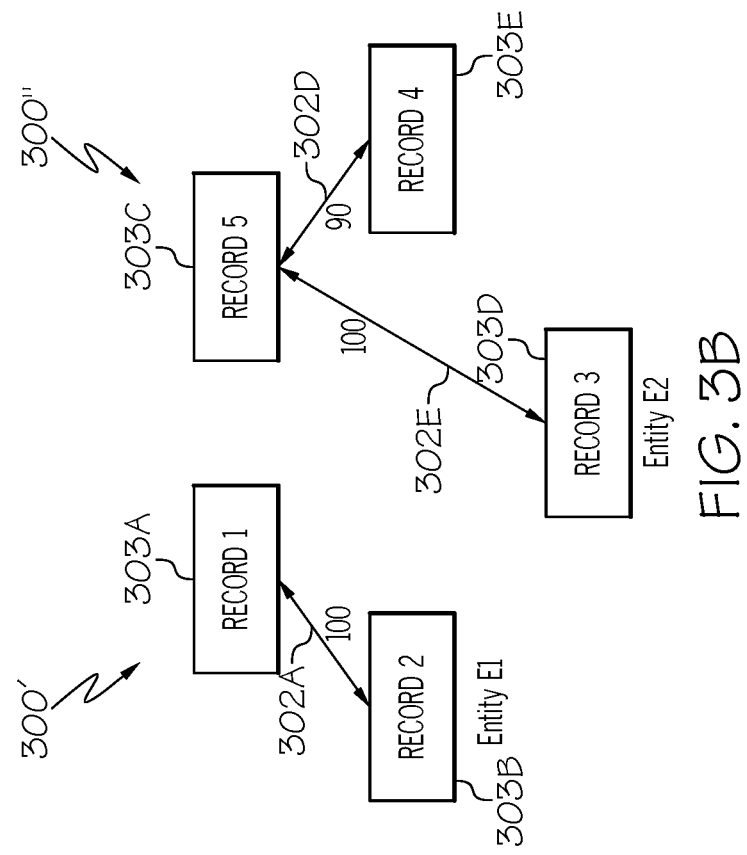
FIG. 3B illustrates graphs representing the sub-entities of the entity of records to be disintegrated using Algorithm 1 in accordance with an embodiment of the present disclosure.

Based on utilizing Algorithm 1, constructing engine 203 selects an edge out of one or more edges connected to a vertex for each vertex of the first graph with a maximum weight. Furthermore, constructing engine 203 removes those edges in the first graph that were not selected. Two or more graphs (graphs H) are then constructed to include records connected to one or more other records using the selected edges while preserving matching links. An illustration of utilizing Algorithm 1 is depicted in FIGS. 3A and 3B.

Figure 3A:
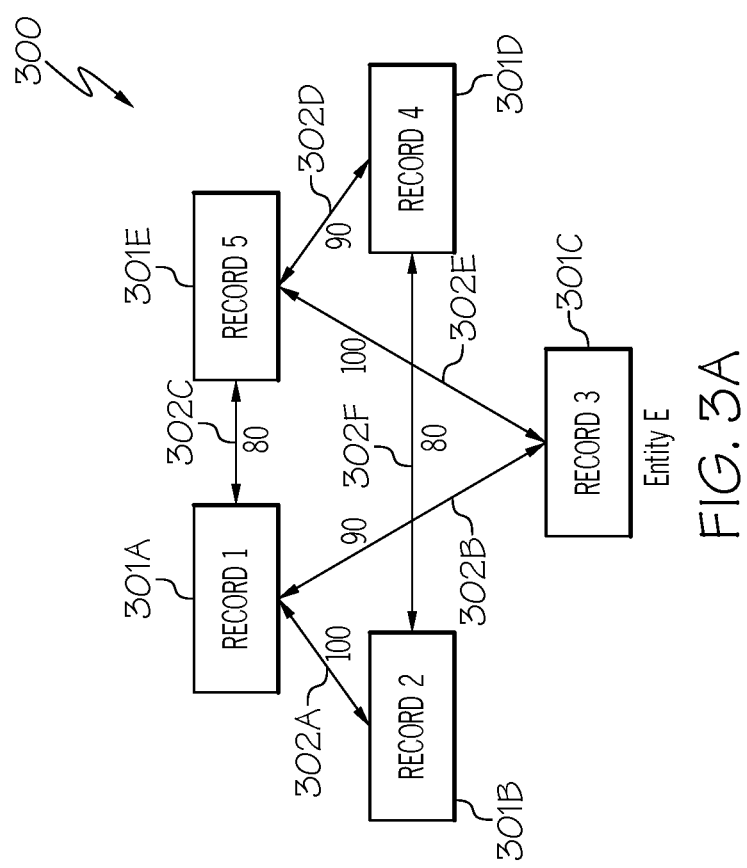
FIG. 3A illustrates a graph of the entity of records to be disintegrated using Algorithm 1, where the vertices represent records, in accordance with an embodiment of the present disclosure.

FIG. 3A illustrates a graph 300 (graph G or "first graph") of the entity of records (entity "E") to be disintegrated, where the vertices 301A-301E represent records, such as records 1-5, respectively, using Algorithm 1 in accordance with an embodiment of the present disclosure. Vertices 301A-301E may collectively or individually be referred to as vertices 301 or vertex 301, respectively. Furthermore, each vertex 301 may be referred to herein as the associated record.

Additionally, as illustrated in FIG. 3A, matching records are connected via edges (connections). For example, record 1 is connected to record 2 via edge 302A, record 1 is connected to record 3 via edge 302B, record 1 is connected to record 5 via edge 302C, record 5 is connected to record 4 via edge 302D, record 5 is connected to record 3 via edge 302E, and record 2 is connected to record 4 via edge 302F. Edges 302A-302F may collectively or individually be referred to as edges 302 or edge 302, respectively.

Furthermore, as shown in FIG. 3A, each edge 302 is associated with a weight (similarity score generated by analyzing engine 202) which represents the similarity score indicating a degree of similarity between the pair of records connected to each other via edge 302. For example, the weight of edge 302A is 100, the weight of edge 302B is 90, the weight of edge 302C is 80, the weight of edge 302D is 90, the weight of edge 302E is 100 and the weight of edge 302F is 80.

In one embodiment, the weights representing the similarity scores generated by analyzing engine 202 are scaled scores, such as by multiplying the similarity scores generated by analyzing engine 202 by 100.

Referring now to FIG. 3B, FIG. 3B illustrates graphs 300' and 300" (graphs H) representing the sub-entities (entity E1 and entity E2, respectively) of the entity of records to be disintegrated using Algorithm 1 in accordance with an embodiment of the present disclosure.

As illustrated in FIGS. 3A and 3B, based on utilizing Algorithm 1, constructing engine 203 selects edge 302A which has the maximum weight out of the one or more edges connected to vertex 301A. For example, the other edges, edges 302B and 302C, have weights that are lower than the weight of edge 302A. As a result, constructing engine 203 selects edge 302A.

In another example, constructing engine 203 selects edge 302D which has the maximum weight out of the one or more edges connected to vertex 301D. For example, the other edge, edge 302F has a weight that is lower than the weight of edge 302D. As a result, constructing engine 203 selects edge 302D.

In a further example, constructing engine 203 selects edge 302E which has the maximum weight out of the one or more edges connected to vertex 301E. For example, the other edges, edges 302C and 302D have a weight that is lower than the weight of edge 302E. As a result, constructing engine 203 selects edge 302E.

As depicted in FIG. 3B, those edges 302 that were not selected, such as edges 302B, 302C and 302F are removed.

Furthermore, constructing engine 203 constructs two or more graphs, 300' and 300" (graphs H), to include records connected to one or more other records using the selected edges while preserving the matching links (edges that are used to connect records that are deemed to be matching) as shown in FIG. 3B. For example, as depicted in FIG. 3B, sub-entity E1 includes vertices 303A and 303B representing records 1 and 2, respectively, which are connected to each other via selected edge 302A. Since there were no other selected edges that would allow such records to be connected to any other records, sub-entity E1 simply includes the paired records, records 1 and 2.

Furthermore, as depicted in FIG. 3B, sub-entity E2 includes vertices 303C, 303D, and 303E, representing records 5, 3 and 4, respectively, where records 5 and 3 are connected to each other via selected edge 302E and records 5 and 4 are connected to each other via selected edge 302D. Since there were no other selected edges that would allow such records to be connected to any other records, sub-entity E2 simply includes the paired records, records 5 and 3 and records 5 and 4.

In this manner, the sub-entities formed are smaller than the large entity disintegrated while including the best match for each record, where the best match corresponds to those edges with the maximum weight representing the similarity score between the pair of records connected to each other via the edge, where such a score is based on the pair comparison data.

While FIG. 3B illustrates two sub-entities being formed, it is noted that any number of sub-entities of the entity of records to be disintegrated may be formed, where the minimum number of sub-entities to be constructed is two.

Furthermore, it is noted that a record may be associated with multiple edges that have a maximum weight so it may have multiple connections even after the implementation of Algorithm 1, such as shown by FIG. 3B, which depicts record 5 as having two connections.

In one embodiment, constructing engine 203 constructs the graphs of the sub-entities of the entity of records to be disintegrated based on the number of connections each record has with other records in the first graph (graph of the entity of records to be disintegrated) exceeding a threshold value using the following algorithm (Algorithm 2):

Let V represents the set of vertices in graph G, $v_i$ represents the $i^{th}$ vertex, $e_i$ is the set of all edges connecting to vertex $v_i$ and $e_{i,j}$ is the edge between vertex $v_i$ and $v_j$.
Let U represents the set of vertices in graph H and $u_i$ represents the $i^{th}$ vertex in graph H.
Let $a_{dt}$ be drop threshold defined by user or some advance statistic method.
For each $v_i \in V$:
  IF degree $(v_i) < a_{dt}$:
    Let $e_{i,max}$ be the set of edges connecting to $v_i$ and having maximum weight among all the edges connecting to $v_i$.
    For each $e_{i,j} \in e_{i,max}$:
      Add an edge between $u_i$ and $u_j$ in H with weight of edge $e_{i,j}$.
  ELSE:
    For each $e_{i,j} \in e_i$:
      Add an edge between $u_i$ and $u_j$ in H with weight of edge $e_{i,j}$.

Based on utilizing Algorithm 2, constructing engine 203 identifies vertices that are deemed to have a high degree of centrality. A "degree of centrality," as used herein, refers to the number of connections a vertex representing a record has with other vertices representing other records. A vertex which is connected to many other vertices is said to have a high degree of centrality, which is an indication of importance of the vertex in the first graph (graph of the entity of records to be disintegrated). Hence, constructing engine 203 considers a record with a number of connections that exceeds a user-designated number of connections to correspond to an important record of graph 1, and hence, will retain its edges. In one embodiment, for records that do not have such a threshold number of connections, constructing engine 203 does not allow such records to retain their connections, except for the connection (or edge) with a maximum weight (maximum similarity score) for those records (records with two or more connections) whose number of connections did not exceed the threshold value.

In one embodiment, constructing engine 203 counts the number of connections each record has with other records in the first graph (graph of the entity of records to be disintegrated). In one embodiment, constructing engine 203 selects the connections of those records with a number of connections that exceeds a threshold value. Furthermore, in one embodiment, constructing engine 203 selects the connection associated with the maximum weight (maximum similarity score) out of the two or more connections to those records (for those records with two or more connections) whose number of connections did not exceed the threshold value and removes the other connections. Constructing engine 203 then constructs two or more graphs (graphs H) to include those records connected to zero or more other records using the selected connections. An illustration of utilizing Algorithm 2 is depicted in FIGS. 4A and 4B.

Figures 4A, 4B:
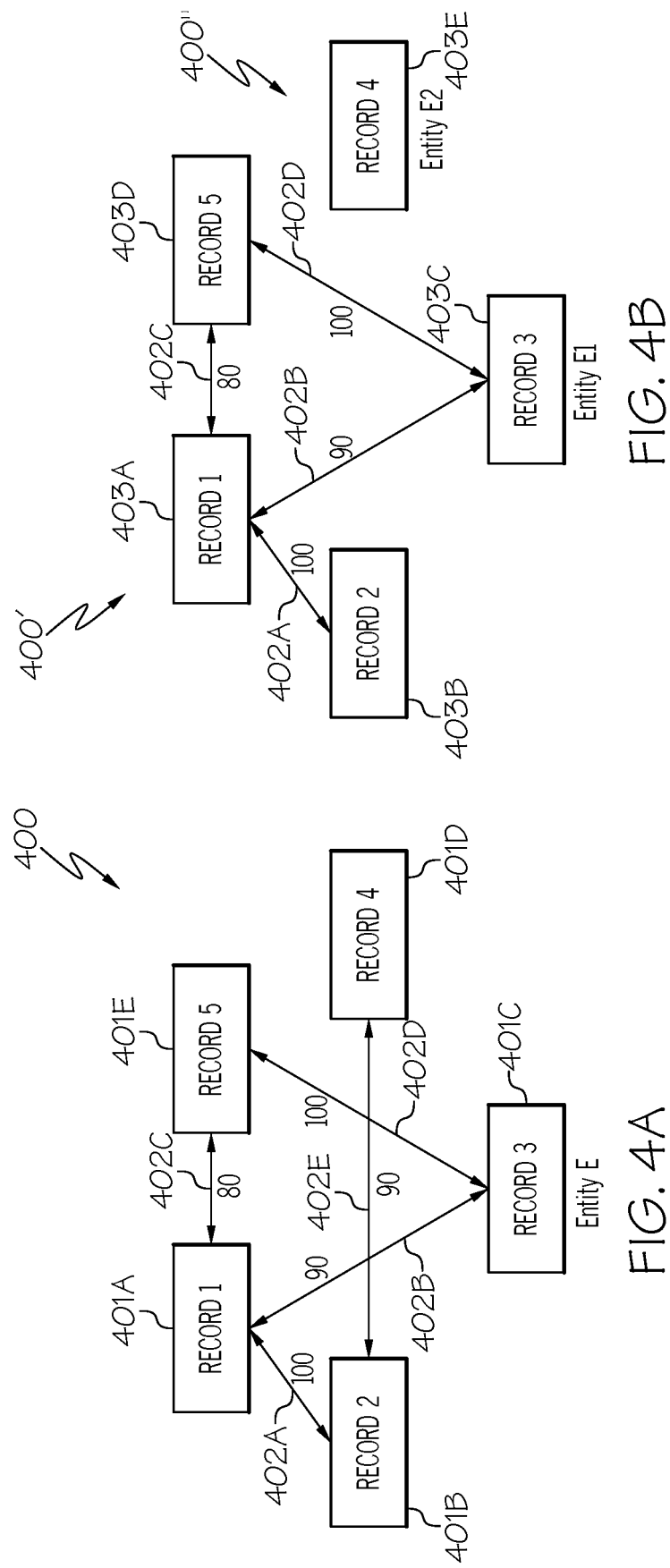
FIG. 4A illustrates a graph of the entity of records to be disintegrated using Algorithm 2, where the vertices represent records, in accordance with an embodiment of the present disclosure.
FIG. 4B illustrates graphs representing the sub-entities of the entity of records to be disintegrated using Algorithm 2 in accordance with an embodiment of the present disclosure.

FIG. 4A illustrates a graph 400 (graph G or "first graph") of the entity of records (entity "E") to be disintegrated, where the vertices 401A-401E represent records, such as records 1-5, respectively, using Algorithm 2 in accordance with an embodiment of the present disclosure. Vertices 401A-401E may collectively or individually be referred to as vertices 401 or vertex 401, respectively. Furthermore, each vertex 401 may be referred to herein as the associated record.

Additionally, as illustrated in FIG. 4A, matching records are connected via edges (connections). For example, record 1 is connected to record 2 via edge 402A, record 1 is connected to record 3 via edge 402B, record 1 is connected to record 5 via edge 402C, record 5 is connected to record 3 via edge 402D, and record 2 is connected to record 4 via edge 402E. Edges 402A-402E may collectively or individually be referred to as edges 402 or edge 402, respectively.

Furthermore, as shown in FIG. 4A, each edge 402 is associated with a weight (similarity score generated by analyzing engine 202) which represents the similarity score indicating a degree of similarity between the pair of records connected to each other via edge 402. For example, the weight of edge 402A is 100, the weight of edge 402B is 90, the weight of edge 402C is 80, the weight of edge 402D is 100, and the weight of edge 402E is 90.

In one embodiment, the weights representing the similarity scores generated by analyzing engine 202 are scaled scores, such as by multiplying the similarity scores generated by analyzing engine 202 by 100.

Referring now to FIG. 4B, FIG. 4B illustrates graphs 400' and 400" (graphs H) representing the sub-entities (entity E1 and entity E2, respectively) of the entity of records to be disintegrated using Algorithm 2 in accordance with an embodiment of the present disclosure.

As illustrated in FIGS. 4A and 4B, based on utilizing Algorithm 2, constructing engine 203 selects the connections from record 1 since such a number of connections exceeds a threshold value, which may be user-designated (e.g., 2 connections). For example, as shown in FIG. 4A, record 1 has three connections (edges 402A, 402B and 402C).

For the other records, whose connections were not selected, the connection associated with the maximum weight out of the two or more connections to such records (records with two or more connections) is selected. For example, as shown in FIGS. 4A and 4B, the connections to record 2 at vertex 401B were not selected since there were only two connections to record 2. As a result, the connection with the maximum weight (edge 402A) was selected, which was previously selected via the selection of the connections of record 1 as discussed above. In another example, as shown in FIGS. 4A and 4B, the connections to record 3 at vertex 401C were not selected since there were only two connections to record 3. As a result, the connection with the maximum weight (edge 402D) was selected. In a further example, as shown in FIGS. 4A and 4B, the connections to record 5 at vertex 401E were not selected since there were only two connections to record 5. As a result, the connection with the maximum weight (edge 402D) was selected, which was also previously selected in connection with the analysis of the connections to record 3.

As further illustrated in FIGS. 4A and 4B, since there was only a single connection (e.g., edge 402E) to record 4 at vertex 401D that was not selected in connection with the analysis of the connections to record 2, such a connection (edge 402E) was rejected. As a result, record 4 is the sole record at vertex 403E at graph 400" as discussed below.

As depicted in FIG. 4B, those connections (edges 402) that were not selected, such as connection 402E, are removed.

Furthermore, constructing engine 203 constructs two or more graphs, 400' and 400" (graphs H), to include records connected to one or more other records using the selected connections (edges) while preserving the matching links (edges that are used to connect records that are deemed to be matching) as shown in FIG. 4B. For example, as depicted in FIG. 4B, sub-entity E1 includes vertices 403A, 403B, 403C and 403D representing records 1, 2, 3, and 5, respectively, where record 1 is connected to records 2, 3 and 5 via edges 402A, 402B and 402C, respectively. Furthermore, as illustrated in FIG. 4B, record 2 is connected to record 1 via edge 402A, record 3 is connected to records 1 and 5 via edges 402B and 402D, respectively, and record 5 is connected to records 1 and 3 via edges 402C and 402D, respectively.

Since there were no other selected connections that would allow record 4 to be connected to any other records, sub-entity E2 includes vertex 403E representing record 4.

In this manner, the sub-entities formed are smaller than the large entity disintegrated while including those records that are deemed to have a high degree of centrality.

While FIG. 4B illustrates two sub-entities being formed, it is noted that any number of sub-entities of the entity of records to be disintegrated may be formed, where the minimum number of sub-entities to be constructed is two.

A further description of these and other features is provided below in connection with the discussion of the method for disintegrating a large entity of records formed from master data management system 101 that may include unmatched pairs of records into smaller entities of records with a greater stability.

Prior to the discussion of the method for disintegrating a large entity of records formed from master data management system 101 that may include unmatched pairs of records into smaller entities of records with a greater stability, a description of the hardware configuration of MDM system 101 (FIG. 1) is provided below in connection with FIG. 5.

Figure 5:
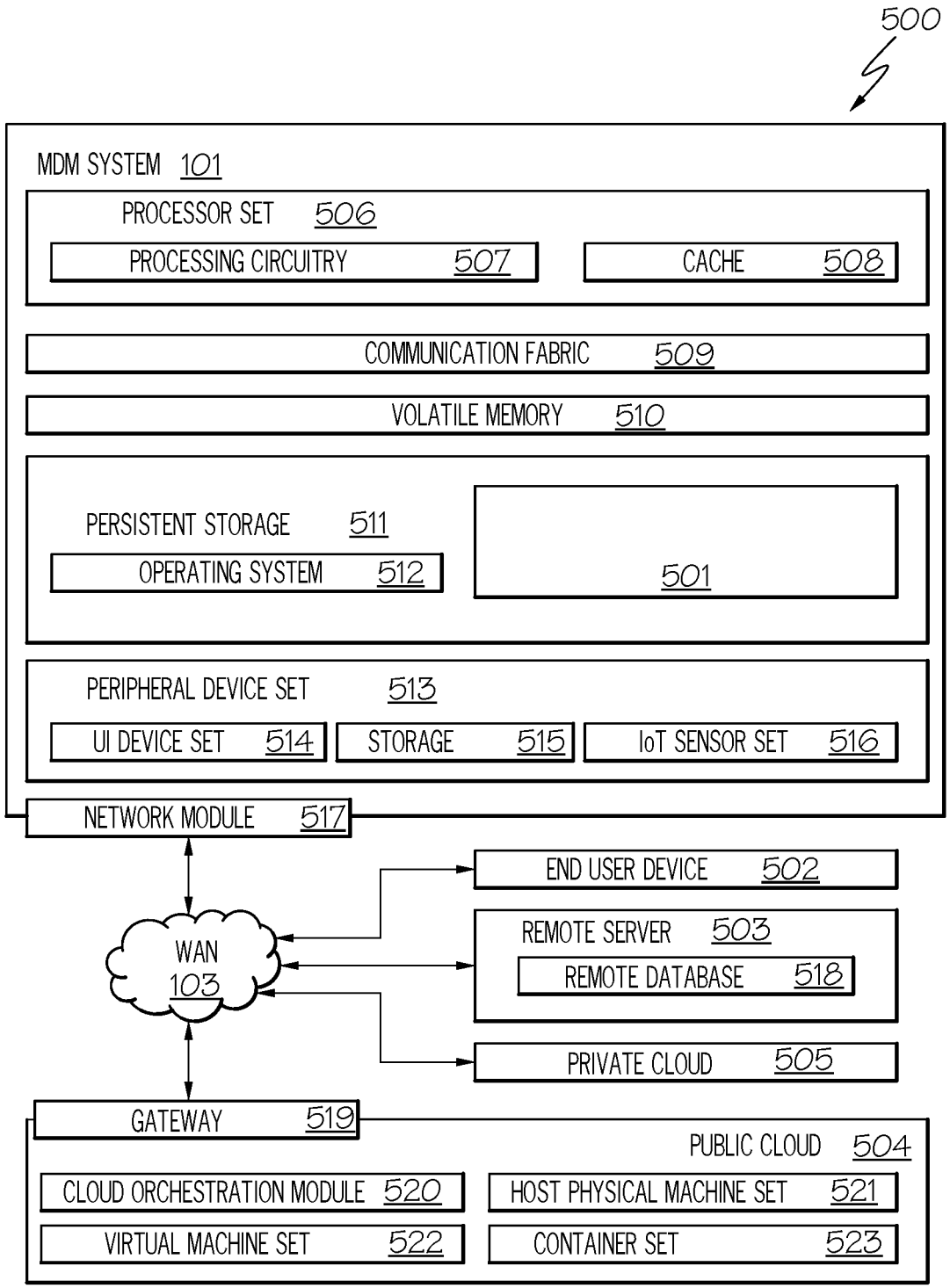
FIG. 5 illustrates an embodiment of the present disclosure of the hardware configuration of the master data management system which is representative of a hardware environment for practicing the present disclosure.

Referring now to FIG. 5, in conjunction with FIG. 1, FIG. 5 illustrates an embodiment of the present disclosure of the hardware configuration of MDM system 101 which is representative of a hardware environment for practicing the present disclosure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 500 contains an example of an environment for the execution of at least some of the computer code (computer code for disintegrating a large entity of records into smaller entities of records with a greater stability, which is stored in block 501) involved in performing the disclosed methods, such as disintegrating a large entity of records into smaller entities of records with a greater stability. In addition to block 501, computing environment 500 includes, for example, MDM system 101, network 103, such as a wide area network (WAN), end user device (EUD) 502, remote server 503, public cloud 504, and private cloud 505. In this embodiment, MDM system 101 includes processor set 506 (including processing circuitry 507 and cache 508), communication fabric 509, volatile memory 510, persistent storage 511 (including operating system 512 and block 501, as identified above), peripheral device set 513 (including user interface (UI) device set 514, storage 515, and Internet of Things (IoT) sensor set 516), and network module 517. Remote server 503 includes remote database 518. Public cloud 504 includes gateway 519, cloud orchestration module 520, host physical machine set 521, virtual machine set 522, and container set 523.

MDM system 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 518. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically MDM system 101, to keep the presentation as simple as possible. MDM system 101 may be located in a cloud, even though it is not shown in a cloud in FIG. 5. On the other hand, MDM system 101 is not required to be in a cloud except to any extent as may be affirmatively indicated.

Processor set 506 includes one, or more, computer processors of any type now known or to be developed in the future. Processing circuitry 507 may be distributed over multiple packages, for example, multiple, coordinated integrated circuit chips. Processing circuitry 507 may implement multiple processor threads and/or multiple processor cores. Cache 508 is memory that is located in the processor chip package(s) and is typically used for data or code that should be available for rapid access by the threads or cores running on processor set 506. Cache memories are typically organized into multiple levels depending upon relative proximity to the processing circuitry. Alternatively, some, or all, of the cache for the processor set may be located "off chip." In some computing environments, processor set 506 may be designed for working with qubits and performing quantum computing.

Computer readable program instructions are typically loaded onto MDM system 101 to cause a series of operational steps to be performed by processor set 506 of MDM system 101 and thereby effect a computer-implemented method, such that the instructions thus executed will instantiate the methods specified in flowcharts and/or narrative descriptions of computer-implemented methods included in this document (collectively referred to as "the disclosed methods"). These computer readable program instructions are stored in various types of computer readable storage media, such as cache 508 and the other storage media discussed below. The program instructions, and associated data, are accessed by processor set 506 to control and direct performance of the disclosed methods. In computing environment 500, at least some of the instructions for performing the disclosed methods may be stored in block 501 in persistent storage 511.

Communication fabric 509 is the signal conduction paths that allow the various components of MDM system 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 510 is any type of volatile memory now known or to be developed in the future. Examples include dynamic type random access memory (RAM) or static type RAM. Typically, the volatile memory is characterized by random access, but this is not required unless affirmatively indicated. In MDM system 101, the volatile memory 510 is located in a single package and is internal to MDM system 101, but, alternatively or additionally, the volatile memory may be distributed over multiple packages and/or located externally with respect to MDM system 101.

Persistent Storage 511 is any form of non-volatile storage for computers that is now known or to be developed in the future. The non-volatility of this storage means that the stored data is maintained regardless of whether power is being supplied to MDM system 101 and/or directly to persistent storage 511. Persistent storage 511 may be a read only memory (ROM), but typically at least a portion of the persistent storage allows writing of data, deletion of data and re-writing of data. Some familiar forms of persistent storage include magnetic disks and solid state storage devices. Operating system 512 may take several forms, such as various known proprietary operating systems or open source Portable Operating System Interface type operating systems that employ a kernel. The code included in block 501 typically includes at least some of the computer code involved in performing the disclosed methods.

Peripheral device set 513 includes the set of peripheral devices of MDM system 101. Data communication connections between the peripheral devices and the other components of MDM system 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 514 may include components such as a display screen, speaker, microphone, wearable devices (such as goggles and smart watches), keyboard, mouse, printer, touchpad, game controllers, and haptic devices. Storage 515 is external storage, such as an external hard drive, or insertable storage, such as an SD card. Storage 515 may be persistent and/or volatile. In some embodiments, storage 515 may take the form of a quantum computing storage device for storing data in the form of qubits. In embodiments where MDM system 101 is required to have a large amount of storage (for example, where MDM system 101 locally stores and manages a large database) then this storage may be provided by peripheral storage devices designed for storing very large amounts of data, such as a storage area network (SAN) that is shared by multiple, geographically distributed computers. IoT sensor set 516 is made up of sensors that can be used in Internet of Things applications. For example, one sensor may be a thermometer and another sensor may be a motion detector.

Network module 517 is the collection of computer software, hardware, and firmware that allows MDM system 101 to communicate with other computers through WAN 103. Network module 517 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 517 are performed on the same physical hardware device. In other embodiments (for example, embodiments that utilize software-defined networking (SDN)), the control functions and the forwarding functions of network module 517 are performed on physically separate devices, such that the control functions manage several different network hardware devices. Computer readable program instructions for performing the disclosed methods can typically be downloaded to MDM system 101 from an external computer or external storage device through a network adapter card or network interface included in network module 517.

WAN 103 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 502 is any computer system that is used and controlled by an end user (for example, a customer of an enterprise that operates MDM system 101), and may take any of the forms discussed above in connection with MDM system 101. EUD 502 typically receives helpful and useful data from the operations of MDM system 101. For example, in a hypothetical case where MDM system 101 is designed to provide a recommendation to an end user, this recommendation would typically be communicated from network module 517 of MDM system 101 through WAN 103 to EUD 502. In this way, EUD 502 can display, or otherwise present, the recommendation to an end user. In some embodiments, EUD 502 may be a client device, such as thin client, heavy client, mainframe computer, desktop computer and so on.

Remote server 503 is any computer system that serves at least some data and/or functionality to MDM system 101. Remote server 503 may be controlled and used by the same entity that operates MDM system 101. Remote server 503 represents the machine(s) that collect and store helpful and useful data for use by other computers, such as MDM system 101. For example, in a hypothetical case where MDM system 101 is designed and programmed to provide a recommendation based on historical data, then this historical data may be provided to MDM system 101 from remote database 518 of remote server 503.

Public cloud 504 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 504 is performed by the computer hardware and/or software of cloud orchestration module 520. The computing resources provided by public cloud 504 are typically implemented by virtual computing environments that run on various computers making up the computers of host physical machine set 521, which is the universe of physical computers in and/or available to public cloud 504. The virtual computing environments (VCEs) typically take the form of virtual machines from virtual machine set 522 and/or containers from container set 523. It is understood that these VCEs may be stored as images and may be transferred among and between the various physical machine hosts, either as images or after instantiation of the VCE. Cloud orchestration module 520 manages the transfer and storage of images, deploys new instantiations of VCEs and manages active instantiations of VCE deployments. Gateway 519 is the collection of computer software, hardware, and firmware that allows public cloud 504 to communicate through WAN 103.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 505 is similar to public cloud 304, except that the computing resources are only available for use by a single enterprise. While private cloud 505 is depicted as being in communication with WAN 103 in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 504 and private cloud 505 are both part of a larger hybrid cloud.

Block 501 further includes the software components discussed above in connection with FIGS. 2, 3A-3B and 4A-4B to disintegrate a large entity of records formed from master data management system 101 that may include unmatched pairs of records into smaller entities of records with a greater stability. In one embodiment, such components may be implemented in hardware. The functions discussed above performed by such components are not generic computer functions. As a result, MDM system 101 is a particular machine that is the result of implementing specific, non-generic computer functions.

In one embodiment, the functionality of such software components of MDM system 101, including the functionality for disintegrating a large entity of records formed from master data management system 101 that may include unmatched pairs of records into smaller entities of records with a greater stability, may be embodied in an application specific integrated circuit.

As stated above, in master data management systems, a master data management matching engine forms an entity of records based on "partial matching," where different record attributes (e.g., name, address) are compared from each pair of records, and if the similarity between such record attributes exceeds a threshold, then such records are deemed to match. Upon identifying such matched pair of records, such records form part of the entity. Furthermore, the master data management matching engine matches records in the entity via transitive linking, where a match between records is made indirectly due to the behavior of other matches. For example, if record 1 matches to record 2 and record 2 matches to record 3 and record 3 matches to record 4, then based on transitive linking, master data management matching engine deems that record 4 matches record 1 even though there was no explicit rule that matched record 4 to record 1. As a result of implementing partial matching along with transitive linking, the size of the entity may be quite large with two randomly picked records not matching. For instance, referring to the above example, even though the master data management matching engine determined that record 4 matches record 1, the similarity score corresponding to the degree of similarity between such a pair of records may be low, and hence, such a pair of records do not actually match each other. Unfortunately, due to the size of such large entities, it is difficult to identify such unmatched pairs of records. Currently, there is not a means for improving the stability of the entity in terms of having the appropriately matched records in the entity.

Figure 6:
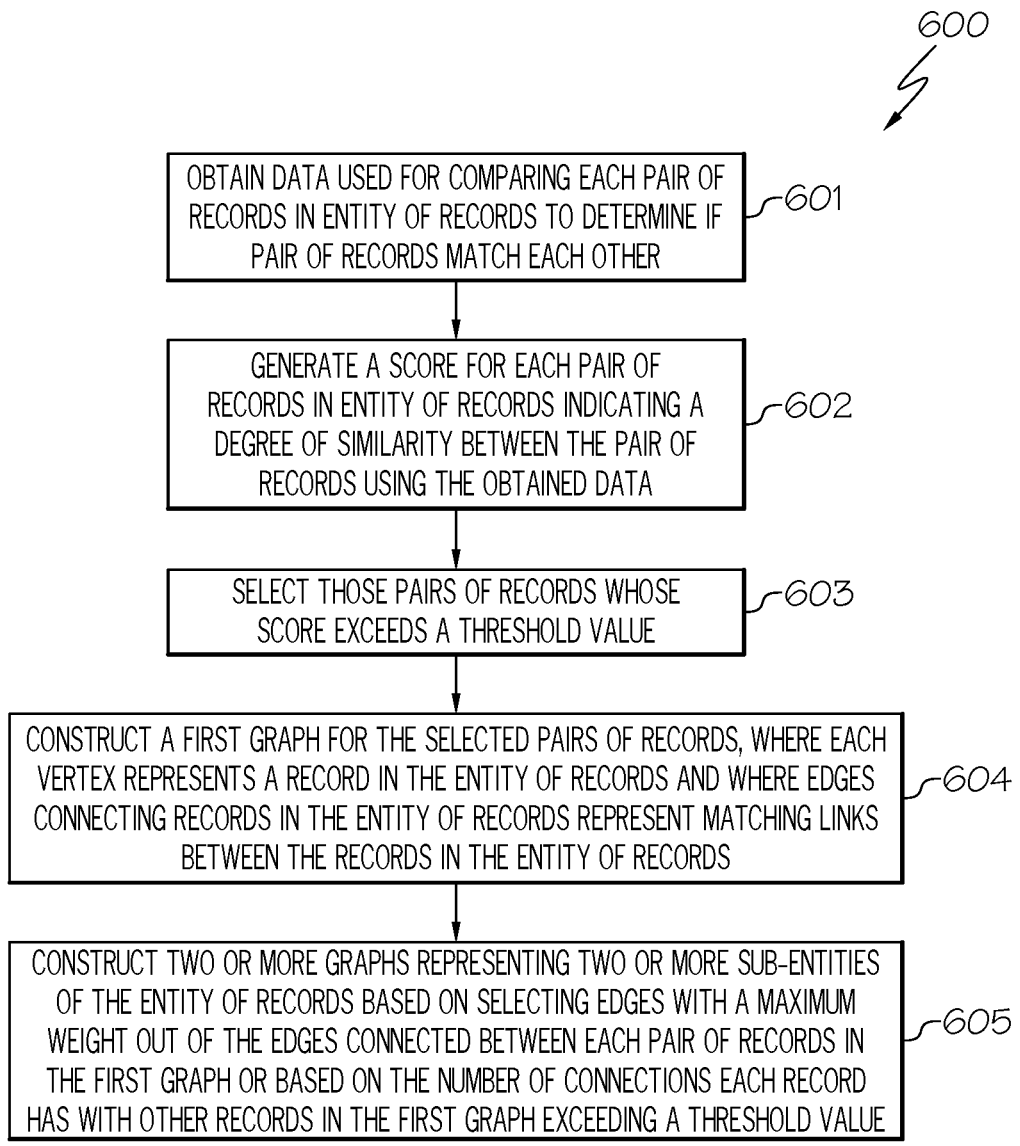
FIG. 6 is a flowchart of a method for disintegrating a large entity of records formed from the master data management system into smaller entities of records with a greater stability in accordance with an embodiment of the present disclosure.
Figure 7:
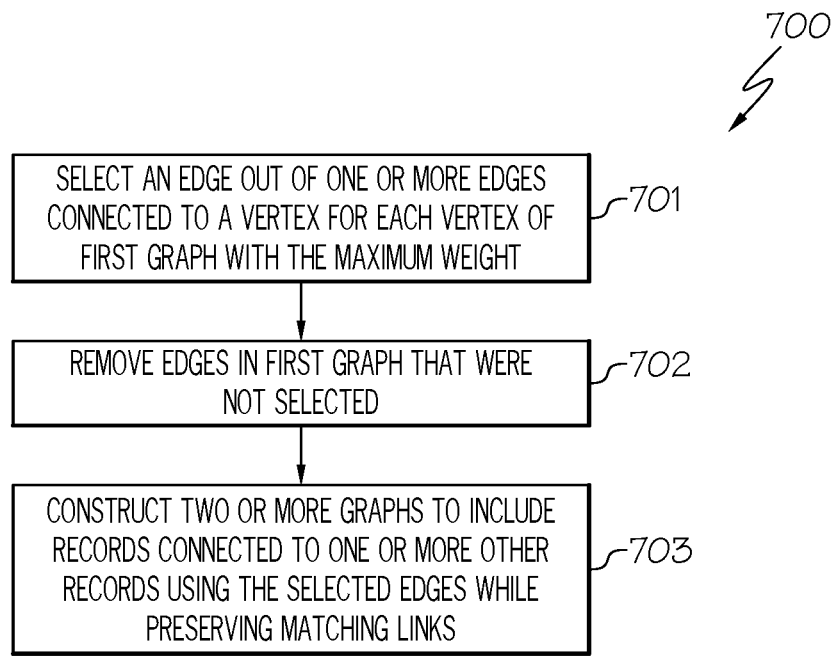
FIG. 7 is a flowchart of a method for constructing graphs representing two or more sub-entities of the large entity of records based on selecting edges with a maximum weight out of the edges connected between each pair of records in the graph of the large entity of records in accordance with an embodiment of the present disclosure.
Figure 8:
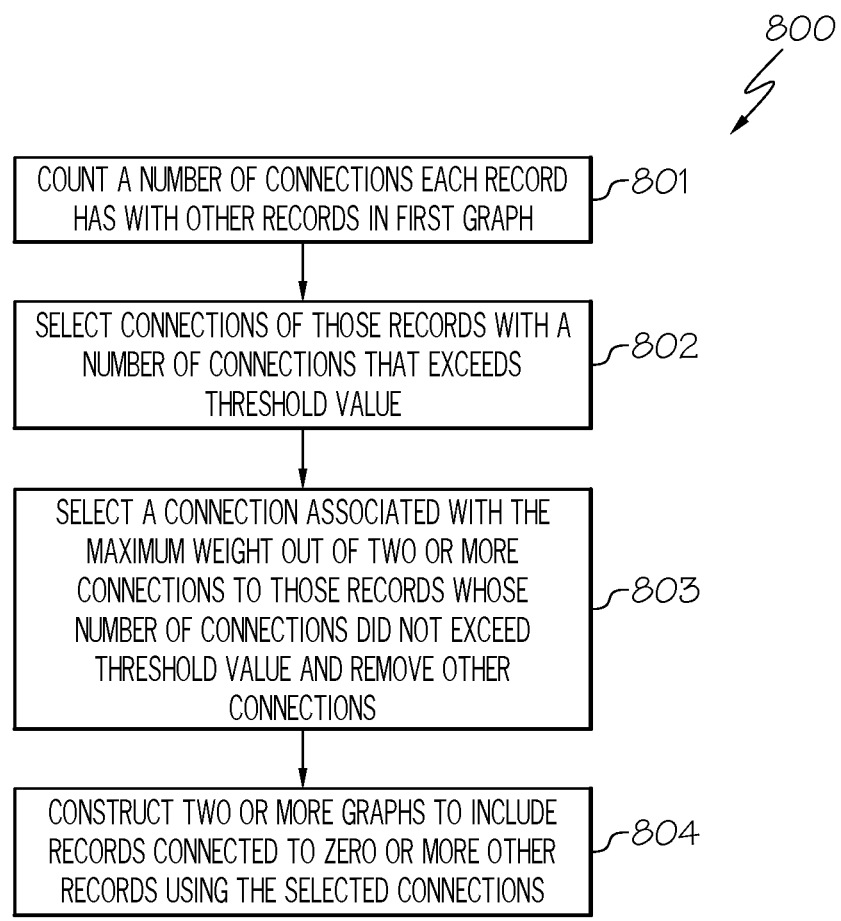
FIG. 8 is a flowchart of a method for constructing graphs representing two or more sub-entities of the large entity of records based on the number of connections each record has with other records in the graph of the large entity of records in accordance with an embodiment of the present disclosure.

The embodiments of the present disclosure provide a means for providing more stable entities by disintegrating a large entity of records formed from master data management system 101 that may include unmatched pairs of records into smaller entities of records with a greater stability (i.e., with a lower number of unmatched pairs of records) as discussed below in connection with FIGS. 6-8. FIG. 6 is a flowchart of a method for disintegrating a large entity of records formed from master data management system 101 into smaller entities of records with a greater stability. FIG. 7 is a flowchart of a method for constructing graphs representing two or more sub-entities of the large entity of records based on selecting edges with a maximum weight out of the edges connected between each pair of records in the graph of the large entity of records. FIG. 8 is a flowchart of a method for constructing graphs representing two or more sub-entities of the large entity of records based on the number of connections each record has with other records in the graph of the large entity of records.

As stated above, FIG. 6 is a flowchart of a method 600 for disintegrating a large entity of records formed from master data management system 101 into smaller entities of records with a greater stability in accordance with an embodiment of the present disclosure.

Referring to FIG. 6, in conjunction with FIGS. 1-2, 3A-3B, 4A-4B and 5, in operation 601, data collector 201 of MDM system 101 obtains the data (e.g., record attributes, such as name, address, date of birth, etc.), referred to herein as the "pair comparison data," that was used by MDM matching engine 106 for comparing each pair of records from source systems 102 to determine if such a pair of records match each other. Such data pertains to those records that were found to be matched by MDM matching engine 106 that now form the entity of records to be disintegrated.

As discussed above, MDM matching engine 106 performs partial matching to determine if such a pair of records match each other. As discussed above, "partial matching," as used herein, refers to comparing different record attributes (e.g., name, address) from each pair of records from source systems 102, and if the similarity between such record attributes exceeds a threshold, then such records are deemed to match. In one embodiment, such compared record attributes are stored in fields of a database, such as MDM database 107. In one embodiment, data collector 201 obtains such data (compared record attributes) from MDM database 107 that was used for comparing each pair of records to determine if the pair of records match each other.

In operation 602, analyzing engine 202 of MDM system 101 generates a similarity score for each pair of records in the entity of records to be disintegrated using the obtained data (e.g., record attributes). In one embodiment, such a similarity score indicates a degree of similarity between the pair of records using the obtained data (e.g., record attributes).

As stated above, in one embodiment, analyzing engine 202 generates the similarity score based on vectorizing the record attributes, such as via Word2vec, Doc2Vec, GloVe, etc. After being converted into real-valued vectors, a similarity measure, such as cosine similarity or the Euclidean distance, may be used to determine the similarity between the two record attributes.

"Cosine similarity," as used herein, refers to a measure of similarity between two non-zero vectors defined in an inner product space. Cosine similarity is the cosine of the angle between the vectors. That is, it is the dot product of the vectors divided by the product of their lengths. If the measurement exceeds a threshold value, which may be user-designated, then analyzing engine 202 selects such a pair of records to be utilized for constructing a graph for the entity of records to be disintegrated as discussed below.

In one embodiment, the Euclidean distance is calculated as the square root of the sum of the squared differences between the two feature vectors. If the distance exceeds a threshold value, which may be user-designated, then analyzing engine 202 selects such a pair of records to be utilized for constructing a graph for the entity of records to be disintegrated as discussed below.

In one embodiment, the similarity measure is a score between the values of 0 and 1 for vectors that have only positive values. In one embodiment, any negative scores can be made positive by taking its absolute value.

Analyzing engine 202 utilizes various software tools for generating the similarity score, which can include, but are not limited to, TensorFlow®, MathWorks®, plus sklearn, Scikit-learn®, etc.

In operation 603, analyzing engine 202 selects those pairs of records whose similarity score exceeds a threshold value, which may be user-designated.

For example, as discussed above, if the similarity score, such as based on the cosine similarity measure or the Euclidean distance measure, exceeds a threshold value, which may be user-designated, then analyzing engine 202 selects such a pair of records to be utilized for constructing a graph for the entity of records to be disintegrated as discussed below.

In operation 604, constructing engine 203 of MDM system 101 constructs a graph ("first graph" represented herein as graph "G") for the entity of records to be disintegrated that includes the selected pairs of records (those selected by analyzing engine 202). In one embodiment, each vertex of the constructed graph represents one of such selected records and the edges (connections) between such records represent the matching links between such records. "Matching links," as used herein, refer to the edges that are used to connect records that are deemed to be matching, such as those pairs of records with a similarity score that exceeds the threshold value.

As stated above, in one embodiment, each edge is associated with a weight corresponding to the similarity score obtained by analyzing engine 202. That is, each edge is associated with a weight indicating the degree of similarity between the pair of records connected to each other via the edge.

In operation 605, constructing engine 203 of MDM system 101 constructs two or more additional graphs (represented herein as graphs "H") representing two or more sub-entities of the entity of records to be disintegrated, where the vertex of such graphs represents the records in the sub-entities of the entity of records to be disintegrated.

In one embodiment, constructing engine 203 is configured to populate the edges and records in such graphs of the sub-entities of the entity of records to be disintegrated based on selecting edges with a maximum weight out of the edges connected between each pair of records in the first graph (graph of the entity of records to be disintegrated) or based on the number of connections each record has with other records in the first graph exceeding a threshold value as discussed below in connection with FIGS. 7 and 8. A "connection," as used herein, refers to the edge that links or connects records together.

Referring to FIG. 7, FIG. 7 is a flowchart of a method 700 for constructing graphs representing two or more sub-entities of the large entity of records based on selecting edges with a maximum weight out of the edges connected between each pair of records in the graph of the large entity of records in accordance with an embodiment of the present disclosure.

As discussed above, constructing engine 203 constructs such graphs of the sub-entities of the entity of records to be disintegrated based on selecting edges with a maximum weight out of the edges connected between each pair of records in the graph of the large entity of records using the following algorithm (Algorithm 1):

Let V represents the set of vertices and $v_i$ represents the $i^{th}$ vertex in graph G respectively.

Let U represents the set of vertices and $u_i$ represents the $i^{th}$ vertex in graph H respectively.

For each $v_i \in V$:

Suppose $e_{i,j}$ is the edge between vertex $v_i$ and $v_j$. Let $e_{i,max}$ be the set of edges connecting to $v_i$ and having maximum weight among all the edges connecting to $v_i$.

For each $e_{i,k} \in e_{i,max}$:

Add an edge between $u_i$ and $u_k$ in H with weight of edge $e_{i,k}$.

Based on utilizing Algorithm 1, in operation 701, constructing engine 203 of MDM system 101 selects an edge out of one or more edges connected to a vertex for each vertex of the first graph with a maximum weight.

In operation 702, constructing engine 203 of MDM system 101 removes those edges in the first graph that were not selected.

In operation 703, constructing engine 203 of MDM system 101 constructs two or more graphs (graphs H) to include records connected to one or more other records using the selected edges while preserving the matching links.

An illustration of utilizing Algorithm 1 by method 700 is depicted in FIGS. 3A and 3B.

As illustrated in FIG. 3A, matching records are connected via edges (connections). For example, record 1 is connected to record 2 via edge 302A, record 1 is connected to record 3 via edge 302B, record 1 is connected to record 5 via edge 302C, record 5 is connected to record 4 via edge 302D, record 5 is connected to record 3 via edge 302E, and record 2 is connected to record 4 via edge 302F.

Furthermore, as shown in FIG. 3A, each edge 302 is associated with a weight (similarity score generated by analyzing engine 202) which represents the similarity score indicating a degree of similarity between the pair of records connected to each other via edge 302. For example, the weight of edge 302A is 100, the weight of edge 302B is 90, the weight of edge 302C is 80, the weight of edge 302D is 90, the weight of edge 302E is 100 and the weight of edge 302F is 80.

In one embodiment, the weights representing the similarity scores generated by analyzing engine 202 are scaled scores, such as by multiplying the similarity scores generated by analyzing engine 202 by 100.

Furthermore, as illustrated in FIGS. 3A and 3B, based on utilizing Algorithm 1, constructing engine 203 selects edge 302A which has the maximum weight out of the one or more edges connected to vertex 301A. For example, the other edges, edges 302B and 302C, have weights that are lower than the weight of edge 302A. As a result, constructing engine 203 selects edge 302A.

In another example, constructing engine 203 selects edge 302D which has the maximum weight out of the one or more edges connected to vertex 301D. For example, the other edge, edge 302F has a weight that is lower than the weight of edge 302D. As a result, constructing engine 203 selects edge 302D.

In a further example, constructing engine 203 selects edge 302E which has the maximum weight out of the one or more edges connected to vertex 301E. For example, the other edges, edges 302C and 302D have a weight that is lower than the weight of edge 302E. As a result, constructing engine 203 selects edge 302E.

As depicted in FIG. 3B, those edges 302 that were not selected, such as edges 302B, 302C and 302F are removed.

Furthermore, constructing engine 203 constructs two or more graphs, 300' and 300" (graphs H), to include records connected to one or more other records using the selected edges while preserving the matching links (edges that are used to connect records that are deemed to be matching) as shown in FIG. 3B. For example, as depicted in FIG. 3B, sub-entity E1 includes vertices 303A and 303B representing records 1 and 2, respectively, which are connected to each other via selected edge 302A. Since there were no other selected edges that would allow such records to be connected to any other records, sub-entity E1 simply includes the paired records, records 1 and 2.

Furthermore, as depicted in FIG. 3B, sub-entity E2 includes vertices 303C, 303D, and 303E, representing records 5, 3 and 4, respectively, where records 5 and 3 are connected to each other via selected edge 302E and records 5 and 4 are connected to each other via selected edge 302D. Since there were no other selected edges that would allow such records to be connected to any other records, sub-entity E2 simply includes the paired records, records 5 and 3 and records 5 and 4.

In this manner, the sub-entities formed are smaller than the large entity disintegrated while including the best match for each record, where the best match corresponds to those edges with the maximum weight representing the similarity score between the pair of records connected to each other via the edge, where such a score is based on the pair comparison data.

While FIG. 3B illustrates two sub-entities being formed, it is noted that any number of sub-entities of the entity of records to be disintegrated may be formed, where the minimum number of sub-entities to be constructed is two.

Furthermore, it is noted that a record may be associated with multiple edges that have a maximum weight so it may have multiple connections even after the implementation of Algorithm 1, such as shown by FIG. 3B, which depicts record 5 as having two connections.

Referring now to FIG. 8, FIG. 8 is a flowchart of a method 800 for constructing graphs representing two or more sub-entities of the large entity of records based on the number of connections each record has with other records in the graph of the large entity of records in accordance with an embodiment of the present disclosure.

As discussed above, constructing engine 203 constructs such graphs of the sub-entities of the entity of records to be disintegrated based on the number of connections each record has with other records in the graph of the large entity of records using the following algorithm (Algorithm 2).

Let V represents the set of vertices in graph G, $v_i$ represents the $i^{th}$ vertex, $e_i$ is the set of all edges connecting to vertex $v_i$ and $e_{i,j}$ is the edge between vertex $v_i$ and $v_j$.

Let U represents the set of vertices in graph H and $u_i$ represents the $i^{th}$ vertex in graph H.

Let $a_{dt}$ be drop threshold defined by user or some advance statistic method.

For each $v_i \in V$:
  IF degree $(v_i) < a_{dt}$:
    Let $e_{i,max}$ be the set of edges connecting to $v_i$ and having maximum weight among all the edges connecting to $v_i$.
    For each $e_{i,j} \in e_{i,max}$:
      Add an edge between $u_i$ and $u_j$ in H with weight of edge $e_{i,j}$.
  ELSE:
    For each $e_{i,j} \in e_i$:
      Add an edge between $u_i$ and $u_j$ in H with weight of edge $e_{i,j}$.

Based on utilizing Algorithm 2, in operation 801, constructing engine 203 of MDM system 101 counts the number of connections each record has with other records in the first graph (graph of the entity of records to be disintegrated).

In operation 802, constructing engine 203 of MDM system 101 selects the connections of those records with a number of connections that exceeds a threshold value.

In operation 803, constructing engine 203 of MDM system 101 selects the connection associated with the maximum weight (maximum similarity score) out of the two or more connections to those records (for those records with two or more connections) whose number of connections did not exceed the threshold value and removes the other connections.

In operation 804, constructing engine 203 of MDM system 101 constructs two or more graphs (graphs H) to include those records connected to zero or more other records using the selected connections. An illustration of utilizing Algorithm 2 is depicted in FIGS. 4A and 4B.

As illustrated in FIG. 4A, matching records are connected via edges (connections). For example, record 1 is connected to record 2 via edge 402A, record 1 is connected to record 3 via edge 402B, record 1 is connected to record 5 via edge 402C, record 5 is connected to record 3 via edge 402D, and record 2 is connected to record 4 via edge 402E.

Furthermore, as shown in FIG. 4A, each edge 402 is associated with a weight (similarity score generated by analyzing engine 202) which represents the similarity score indicating a degree of similarity between the pair of records connected to each other via edge 402. For example, the weight of edge 402A is 100, the weight of edge 402B is 90, the weight of edge 402C is 80, the weight of edge 402D is 100, and the weight of edge 402E is 90.

In one embodiment, the weights representing the similarity scores generated by analyzing engine 202 are scaled scores, such as by multiplying the similarity scores generated by analyzing engine 202 by 100.

Furthermore, as illustrated in FIGS. 4A and 4B, based on utilizing Algorithm 2, constructing engine 203 selects the connections from record 1 since such a number of connections exceeds a threshold value, which may be user-designated (e.g., 2 connections). For example, as shown in FIG. 4A, record 1 has three connections (edges 402A, 402B and 402C).

For the other records, whose connections were not selected, the connection associated with the maximum weight out of the two or more connections to such records (records with two or more connections) is selected. For example, as shown in FIGS. 4A and 4B, the connections to record 2 at vertex 401B were not selected since there were only two connections to record 2. As a result, the connection with the maximum weight (edge 402A) was selected, which was previously selected via the selection of the connections of record 1 as discussed above. In another example, as shown in FIGS. 4A and 4B, the connections to record 3 at vertex 401C were not selected since there were only two connections to record 3. As a result, the connection with the maximum weight (edge 402D) was selected. In a further example, as shown in FIGS. 4A and 4B, the connections to record 5 at vertex 401E were not selected since there were only two connections to record 5. As a result, the connection with the maximum weight (edge 402D) was selected, which was also previously selected in connection with the analysis of the connections to record 3.

As further illustrated in FIGS. 4A and 4B, since there was only a single connection (e.g., edge 402E) to record 4 at vertex 401D that was not selected in connection with the analysis of the connections to record 2, such a connection (edge 402E) was rejected. As a result, record 4 is the sole record at vertex 403E at graph 400″ as discussed below.

As depicted in FIG. 4B, those connections (edges 402) that were not selected, such as connection 402E, are removed.

Furthermore, constructing engine 203 constructs two or more graphs, 400′ and 400″ (graphs H), to include records connected to one or more other records using the selected connections (edges) while preserving the matching links (edges that are used to connect records that are deemed to be matching) as shown in FIG. 4B. For example, as depicted in FIG. 4B, sub-entity E1 includes vertices 403A, 403B, 403C and 403D representing records 1, 2, 3, and 5, respectively, where record 1 is connected to records 2, 3 and 5 via edges 402A, 402B and 402C, respectively. Furthermore, as illustrated in FIG. 4B, record 2 is connected to record 1 via edge 402A, record 3 is connected to records 1 and 5 via edges 402B and 402D, respectively, and record 5 is connected to records 1 and 3 via edges 402C and 402D, respectively.

Since there were no other selected connections that would allow record 4 to be connected to any other records, sub-entity E2 includes vertex 403E representing record 4.

In this manner, the sub-entities formed are smaller than the large entity disintegrated while including those records that are deemed to have a high degree of centrality.

While FIG. 4B illustrates two sub-entities being formed, it is noted that any number of sub-entities of the entity of records to be disintegrated may be formed, where the minimum number of sub-entities to be constructed is two.

As a result of the foregoing, the principles of the present disclosure provide more stable entities by disintegrating a large entity of records formed from a master data management system that may include unmatched pairs of records into smaller entities of records with a greater stability (i.e., with a lower number of unmatched pairs of records).

Furthermore, the principles of the present disclosure improve the technology or technical field involving master data management.

As discussed above, in master data management systems, a master data management matching engine forms an entity of records based on "partial matching," where different record attributes (e.g., name, address) are compared from each pair of records, and if the similarity between such record attributes exceeds a threshold, then such records are deemed to match. Upon identifying such matched pair of records, such records form part of the entity. Furthermore, the master data management matching engine matches records in the entity via transitive linking, where a match between records is made indirectly due to the behavior of other matches. For example, if record 1 matches to record 2 and record 2 matches to record 3 and record 3 matches to record 4, then based on transitive linking, master data management matching engine deems that record 4 matches record 1 even though there was no explicit rule that matched record 4 to record 1. As a result of implementing partial matching along with transitive linking, the size of the entity may be quite large with two randomly picked records not matching. For instance, referring to the above example, even though the master data management matching engine determined that record 4 matches record 1, the similarity score corresponding to the degree of similarity between such a pair of records may be low, and hence, such a pair of records do not actually match each other. Unfortunately, due to the size of such large entities, it is difficult to identify such unmatched pairs of records. Currently, there is not a means for improving the stability of the entity in terms of having the appropriately matched records in the entity.

Embodiments of the present disclosure improve such technology by constructing a graph ("first graph") for the entity of records to be disintegrated, where each vertex of the first graph represents a record in the entity of records to be disintegrated. The edges in the first graph connecting records in the entity of records represent matching links between the records in the entity of records to be disintegrated. "Matching links," as used herein, refer to the edges that are used to connect records that are deemed to be matching, such as those pairs of records with a similarity score that exceeds a threshold value. In one embodiment, each edge is associated with a weight corresponding to such a similarity score. Furthermore, two or more additional graphs representing two or more sub-entities of the entity of records to be disintegrated are constructed, where the vertex of such graphs represents the records in the sub-entities of the entity of records to be disintegrated. In one embodiment, such graphs of the sub-entities of the entity of records to be disintegrated are constructed based on selecting edges with a maximum weight out of the edges connected between each pair of records in the first graph or based on the number of connections each record has with other records in the first graph exceeding a threshold value. A "connection," as used herein, refers to the edge that links or connects records together. In this manner, a large entity of records formed from a master data management system that may include unmatched pairs of records is disintegrated into smaller entities of records with a greater stability (i.e., with a lower number of unmatched pairs of records). Furthermore, in this manner, there is an improvement in the technical field involving master data management.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for disintegrating an entity of records into smaller entities, the method comprising:

constructing a first graph comprising vertices, where each of the vertices represent a record in the entity of records, wherein edges in the first graph connecting records in the entity of records represent matching links between the records in the entity of records, wherein a weight of each of the edges represents a score indicating a degree of similarity between a pair of records connected to each other via the edge; and constructing two or more graphs representing two or more sub-entities of the entity of records based on selecting edges with a maximum weight out of edges connected between each pair of records in the first graph or based on a number of connections each record has with other records in the first graph exceeding a first threshold value.

2. The method as recited in claim 1 further comprising:

comparing each pair of records in the entity of records from a master data management system using partial matching to determine if the pair of records match each other, wherein the partial matching comprises comparing different record attributes from the pair of records.

3. The method as recited in claim 2 further comprising:

generating the score for each pair of records in the entity of records indicating the degree of similarity between the pair of records using the obtained data; and selecting those pairs of records whose score exceeds a second threshold value.

4. The method as recited in claim 3, wherein the entity of records comprises the selected pairs of records.

5. The method as recited in claim 1, wherein the two or more graphs are constructed by the following:

selecting an edge out of one or more edges connected to a vertex for each vertex of the first graph with the maximum weight;

removing edges in the first graph that were not selected; and constructing the two or more graphs comprising records connected to one or more other records using the selected edges while preserving matching links.

6. The method as recited in claim 1, wherein the two or more graphs are constructed by the following:

counting a number of connections each record has with other records in the first graph;

selecting connections of those records with a number of connections that exceeds the first threshold value;

selecting a connection associated with the maximum weight out of two or more connections to those records whose number of connections did not exceed the first threshold value; and constructing the two or more graphs comprising records connected to zero or more other records using the selected connections.

7. The method as recited in claim 1, wherein the score indicating the degree of similarity between the pair of records connected to each other via the edge is generated based on vectorizing record attributes of the pair of records, wherein a vertex of the two or more sub-entities represents records in the two or more sub-entities of the entity of records to be disintegrated.

8. A computer program product for disintegrating an entity of records into smaller entities, the computer program product comprising one or more computer readable storage mediums having program code embodied therewith, the program code comprising programming instructions for:

constructing a first graph comprising vertices, where each of the vertices represent a record in the entity of records, wherein edges in the first graph connecting records in the entity of records represent matching links between the records in the entity of records, wherein a weight of each of the edges represents a score indicating a degree of similarity between a pair of records connected to each other via the edge; and constructing two or more graphs representing two or more sub-entities of the entity of records based on selecting edges with a maximum weight out of edges connected between each pair of records in the first graph or based on a number of connections each record has with other records in the first graph exceeding a first threshold value.

9. The computer program product as recited in claim 8, wherein the program code further comprises the programming instructions for:

comparing each pair of records in the entity of records from a master data management system using partial matching to determine if the pair of records match each other, wherein the partial matching comprises comparing different record attributes from the pair of records.

10. The computer program product as recited in claim 9, wherein the program code further comprises the programming instructions for:

generating the score for each pair of records in the entity of records indicating the degree of similarity between the pair of records using the obtained data; and selecting those pairs of records whose score exceeds a second threshold value.

11. The computer program product as recited in claim 10, wherein the entity of records comprises the selected pairs of records.

12. The computer program product as recited in claim 8, wherein the two or more graphs are constructed by the following:

selecting an edge out of one or more edges connected to a vertex for each vertex of the first graph with the maximum weight;

removing edges in the first graph that were not selected; and constructing the two or more graphs comprising records connected to one or more other records using the selected edges while preserving matching links.

13. The computer program product as recited in claim 8, wherein the two or more graphs are constructed by the following:

counting a number of connections each record has with other records in the first graph;

selecting connections of those records with a number of connections that exceeds the first threshold value;

selecting a connection associated with the maximum weight out of two or more connections to those records whose number of connections did not exceed the first threshold value; and constructing the two or more graphs comprising records connected to zero or more other records using the selected connections.

14. The computer program product as recited in claim 8, wherein the score indicating the degree of similarity between the pair of records connected to each other via the edge is generated based on vectorizing record attributes of the pair of records, wherein a vertex of the two or more sub-entities represents records in the two or more sub-entities of the entity of records to be disintegrated.

15. A system, comprising:

a memory for storing a computer program for disintegrating an entity of records into smaller entities; and a processor connected to the memory, wherein the processor is configured to execute program instructions of the computer program comprising:

constructing a first graph comprising vertices, where each of the vertices represent a record in the entity of records, wherein edges in the first graph connecting records in the entity of records represent matching links between the records in the entity of records, wherein a weight of each of the edges represents a score indicating a degree of similarity between a pair of records connected to each other via the edge; and constructing two or more graphs representing two or more sub-entities of the entity of records based on selecting edges with a maximum weight out of edges connected between each pair of records in the first graph or based on a number of connections each record has with other records in the first graph exceeding a first threshold value.

16. The system as recited in claim 15, wherein the program instructions of the computer program further comprise:

comparing each pair of records in the entity of records from a master data management system using partial matching to determine if the pair of records match each other, wherein the partial matching comprises comparing different record attributes from the pair of records.

17. The system as recited in claim 16, wherein the program instructions of the computer program further comprise:

generating the score for each pair of records in the entity of records indicating the degree of similarity between the pair of records using the obtained data; and selecting those pairs of records whose score exceeds a second threshold value.

18. The system as recited in claim 17, wherein the entity of records comprises the selected pairs of records.

19. The system as recited in claim 15, wherein the two or more graphs are constructed by the following:

selecting an edge out of one or more edges connected to a vertex for each vertex of the first graph with the maximum weight;

removing edges in the first graph that were not selected; and constructing the two or more graphs comprising records connected to one or more other records using the selected edges while preserving matching links.

20. The system as recited in claim 15, wherein the two or more graphs are constructed by the following:

counting a number of connections each record has with other records in the first graph;

selecting connections of those records with a number of connections that exceeds the first threshold value;

selecting a connection associated with the maximum weight out of two or more connections to those records whose number of connections did not exceed the first threshold value; and constructing the two or more graphs comprising records connected to zero or more other records using the selected connections.

* * * * *